United States Patent [19]
Evans et al.

[11] Patent Number: 5,911,467
[45] Date of Patent: Jun. 15, 1999

[54] RETRACTABLE VEHICLE CLOSURE SYSTEM

[75] Inventors: Jeffrey L. Evans, Diamond; William G. Oldfield, Canfield, both of Ohio

[73] Assignee: Rollsider, Ltd., Struthers, Ohio

[21] Appl. No.: 08/878,544

[22] Filed: Jun. 19, 1997

Related U.S. Application Data

[63] Continuation-in-part of application No. 08/372,773, Jan. 13, 1995, Pat. No. 5,658,037, which is a continuation-in-part of application No. 08/220,824, Mar. 31, 1994, abandoned.

[51] Int. Cl.$^6$ .................................................. B60P 7/04
[52] U.S. Cl. ...................... 296/181; 296/98; 296/100.15; 160/120
[58] Field of Search ................................. 296/98, 100.15, 296/138–143, 181; 160/120, 122, 241

[56] References Cited

U.S. PATENT DOCUMENTS

| | | |
|---|---|---|
| 1,298,733 | 4/1919 | King . |
| 2,448,054 | 8/1948 | Seckel . |
| 2,576,613 | 11/1951 | Lermont . |
| 3,306,344 | 2/1967 | Youngs ..................................... 160/241 |
| 3,397,009 | 8/1968 | Landenberger . |
| 3,709,552 | 1/1973 | Broadbent . |
| 3,785,694 | 1/1974 | Sargent ..................................... 296/98 |
| 4,302,043 | 11/1981 | Dimmer et al. . |
| 4,380,350 | 4/1983 | Block . |
| 4,484,777 | 11/1984 | Michel . |
| 4,505,512 | 3/1985 | Schmeichel et al. . |
| 4,691,957 | 9/1987 | Ellingson . |
| 4,700,985 | 10/1987 | Whitehead . |
| 4,828,316 | 5/1989 | Bennett et al. ........................ 296/181 |
| 5,085,473 | 2/1992 | Yang . |
| 5,129,698 | 7/1992 | Cohrs et al. . |
| 5,174,625 | 12/1992 | Gothier et al. . |
| 5,180,203 | 1/1993 | Goudy . |
| 5,328,228 | 7/1994 | Klassen . |
| 5,466,030 | 11/1995 | Harris et al. .............................. 296/98 |
| 5,524,693 | 6/1996 | Hamilton ................................ 160/120 |

FOREIGN PATENT DOCUMENTS

| | | |
|---|---|---|
| 0 377 772 A1 | 2/1989 | European Pat. Off. . |
| WO 93/19448 | 9/1993 | WIPO . |

*Primary Examiner*—Dean Kramer
*Attorney, Agent, or Firm*—Fay, Sharpe, Beall, Fagan, Minnich & McKee

[57] ABSTRACT

A retractable curtain-like closure for a vehicle such as a trailer includes an automatic retraction mechanism and vertical and horizontal tensioning mechanisms. Once the curtain has been extended over an open side of the vehicle, the curtain is vertically tensioned by rotation of a roll bar extending along a bottom edge of the curtain until the curtain is taut. The roll bar is held in position during vertical tensioning by a series of hooks located along a bottom edge of the trailer. The curtain is tensioned in a horizontal direction by connecting the side edges of the curtain to a rotatable rod by a series of pins and rotating the rod to tension the curtain. The horizontal tensioning mechanism also includes a weather sealing flap which is closed to seal the side edges of the curtain by rotation of the tensioning rod.

21 Claims, 14 Drawing Sheets

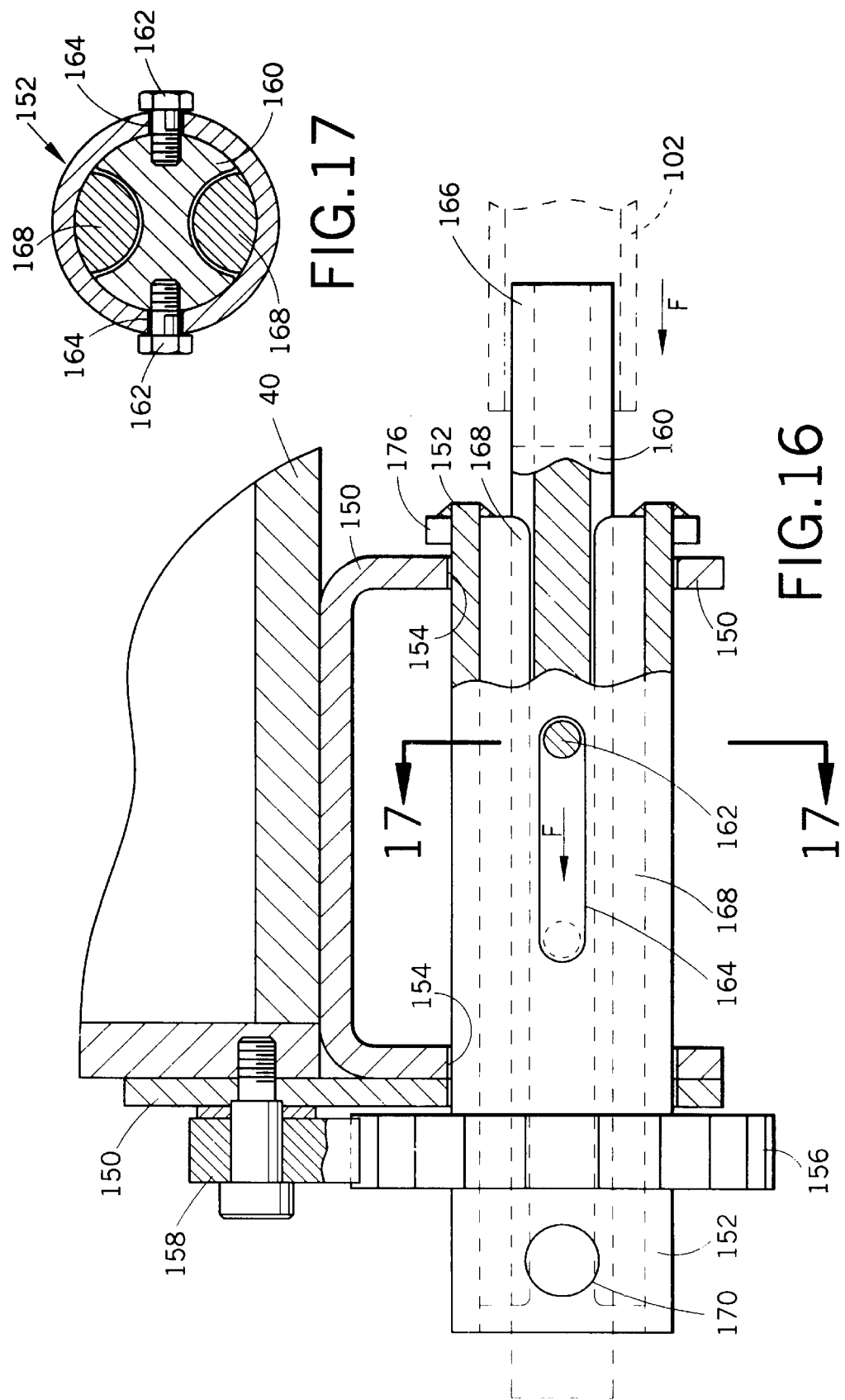

RETRACTABLE VEHICLE CLOSURE SYSTEM

CROSS REFERENCE TO RELATED APPLICATIONS

The present application is a continuation-in-part of application Ser. No. 08/372,773, filed Jan. 13, 1995, now U.S. Pat. No. 5,658,037, which is a continuation-in-part of application Ser. No. 08/220,824, filed Mar. 31, 1994, and now abandoned.

BACKGROUND OF THE INVENTION

The present invention relates to a retractable closure system and, more particularly, to a retractable curtain-like closure for closing the sides, ends, or top of a vehicle such as a trailer.

A variety of proposals have been made in an effort to provide a curtainside vehicle with permanently attached, movably mounted, flexible curtains that can be extended for transporting and retracted for loading of the vehicle. Curtainside vehicles provide an advantage over rigid sided vehicles in that it is possible to load curtainside vehicles from the side in a substantially obstruction-free manner. The length of the side opening of a curtainside trailer allows convenient access to the entire space of the trailer for loading with forklifts or other lifting devices.

The known curtainside vehicles generally include side walls formed of a flexible material supported along a top edge in a track. To open and close the flexible side wall curtains, a pulling or pushing force is normally applied by a human operator standing at ground level and drawing the flexible wall across the side of the vehicle. After the side wall has been positioned to cover the side opening of the trailer, the flexible wall must be fixed in place to prevent billowing of the side wall which may cause damage to the curtain or obstruct the driver's view in the vehicle side view mirrors. The securing of the flexible side walls to the vehicle body has generally been performed by attaching straps to the side wall and to a body of the trailer and tightening these straps to tension the flexible wall. However, the various known strap configurations for securing the flexible walls are rather cumbersome to assemble and tighten requiring multiple tightening steps. In addition, the straps may become twisted, tangled, or worn further complicating the securing operation.

Accordingly, it would be desirable to provide a curtainside vehicle in which the flexible curtain side wall can be automatically retracted and unfurled, and the curtain can be tensioned without needing to resort to straps.

SUMMARY OF THE INVENTION

The present invention contemplates a new and improved curtainside vehicle having an easily retractable and extendable curtain wall which may be tensioned in both a vertical and a horizontal direction without the need for straps.

In accordance with the present invention, a retractable closure system for a vehicle includes a flexible retractable curtain, an automatic retraction mechanism for retracting the flexible curtain into a roll formed adjacent an upper edge of the vehicle opening, a plurality of attachment members located along opposite side edges of the flexible curtain, and a rotatable bar mounted adjacent each of the side edges of the vehicle opening having a plurality of engagement members. The attachment members are arranged to be engaged by the engagement members. A tightening handle is associated with the rotatable bar at each of the side edges of the vehicle opening for rotating the bar to tighten the side edges of the flexible curtain.

According to a further aspect of the invention, a retractable closure system for a curtainside vehicle includes a flexible retractable curtain, a roll bar attached to a lower edge of the curtain and extending along the length of the curtain, an automatic retraction mechanism for retracting the flexible curtain, and a vertical tightening mechanism for providing vertical tension to the curtain in the extended position. The vertical tensioning mechanism includes a rotatable wrench configured to be non-rotatably received within an end of the roll bar and rotated to provide vertical tension to the curtain.

According to a still further aspect of the invention, a retractable closure for a curtainside vehicle includes a flexible curtain having an upper edge, a lower edge, and two side edges and being configured to cover an opening of a curtainside vehicle, a first cord bonded to the upper edge of the curtain along a full length of the upper edge, and a second cord bonded to the lower edge of the curtain along a full length of the lower edge. Two roll bars are received on the upper and lower edges of the curtain. The roll bars each have a substantially cylindrical exterior shape and first and second longitudinal channels having substantially semi-circular cross sections. The longitudinal channels are sized to receive one of the first and second cords to fix the top and bottom edges of the curtain to the roll bars.

One advantage of the invention is the provision of a curtain for a curtainside vehicle with an ability to quickly and easily tension the curtain of the vehicle after it has been unfurled.

Another advantage of the present invention is the provision of a retractable closure system for a curtainside vehicle having a vertical tensioning mechanism including a roll bar and a roll bar engaging wrench.

Still another advantage of the present invention is the provision of a closure system for a curtainside vehicle having a horizontal tensioning mechanism for securing and tensioning the side edges of a curtain.

A further advantage of the present invention is the provision of a curtainside vehicle having a flexible weather sealing flap covering side edges of the curtain to prevent water and dirt from entering the vehicle or the tightening mechanism.

A still further advantage of the present invention is the provision of a curtainside vehicle having horizontal tensioning mechanisms the activation of which also provides a weather sealing function.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 16 is a cutaway cross-sectional view of a rotation mechanism of the vertical tensioning mechanism; and FIG. 17 is a cross-sectional view of the rotatable sleeve and wrench of the vertical tensioning mechanism taken along line 17—17 of FIG. 16.

DETAILED DESCRIPTION OF THE PREFERRED EMBODIMENTS

Figure 1:
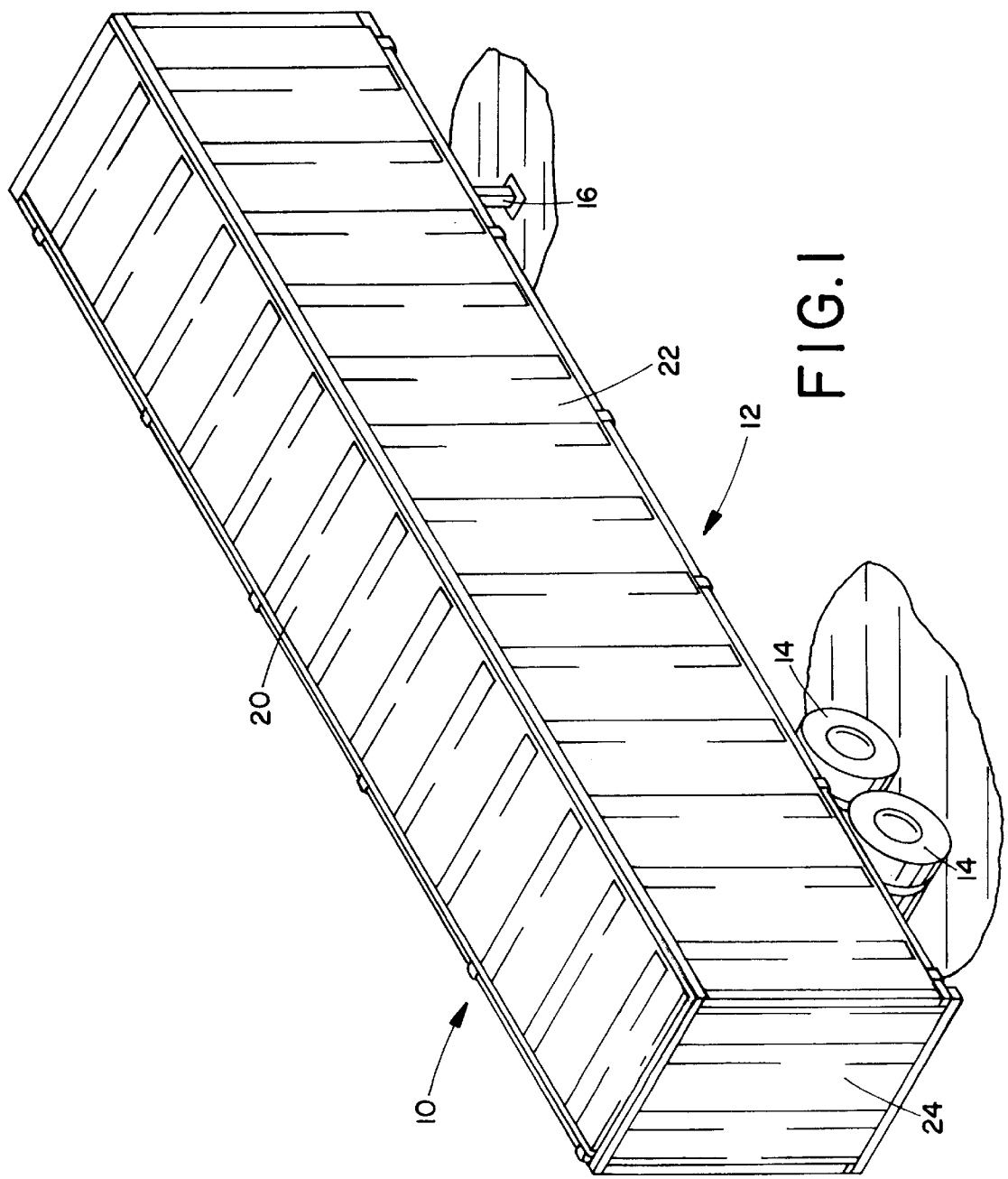
FIG. 1 is a perspective view of a flatbed trailer equipped with side, top, and rear walls formed of curtain-like closures according to a first embodiment of the present invention, with each of the closures in an extended position.

Referring now to the drawings wherein the showings are for the purposes of illustrating the preferred embodiments of the invention only and not for purposes of limiting same, the FIGURES show a retractable vehicle closure system including flexible curtain-like walls and vertical and horizontal tensioning systems for tensioning the flexible curtain-like walls. A freight hauling trailer having a retractable closure system is illustrated in FIG. 1 in a closed or extended position and in FIG. 2 in an open or retracted position. The trailer 10 has an elongate, generally rectangular flatbed 12 extending from a front to a rear of the trailer and supported by wheels 14 underlying a rear portion of the flatbed and legs 16 underlying a front portion of the flatbed. The legs 16 can be retracted when the trailer 10 is connected to and supported by a conventional tractor (not shown).

The trailer 10 includes a top curtain 20, side curtains 22, and a rear curtain 24 all supported by a frame 26 of the trailer. In the fully extended or closed position illustrated in FIG. 1, the curtains 20, 22, 24 completely enclose the trailer 10 for transport of goods. In the retracted or open position illustrated in FIG. 2, the curtains 20, 22, 24 are each rolled up to provide access to the interior of the trailer 10. The curtains 20, 22, 24 are moved between the extended and retracted positions by automatic curtain roll-up and extension mechanisms described below.

Figure 2:
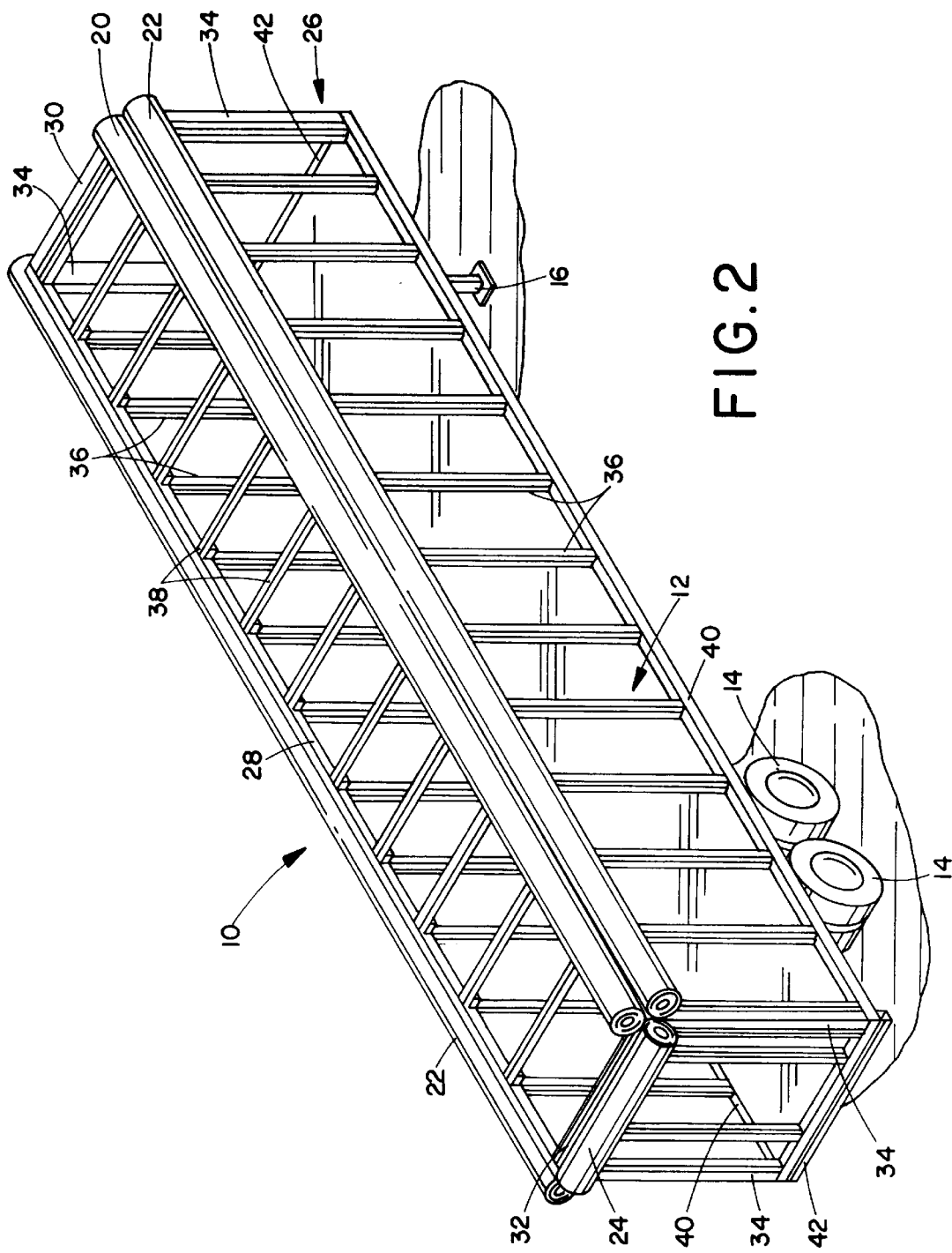
FIG. 2 is a perspective view of the flatbed trailer of FIG. 1 with the retractable closures in their retracted positions.

With continued reference to FIG. 2, the frame 26 includes left and right side headers 28, a front header 30, and a rear header 32 supported by corner supports 34 on the flatbed 12. Removable stakes 36 extend between the flatbed and the headers 28, 30, 32 to further support the frame. Top wall struts 38 are also provided to support the top wall and are positioned between the side headers 28 along the length of the trailer. The flatbed 12 is provided with right and left rub rails 40 and front and rear bumper rails 42 around an exterior of the flatbed for removably supporting the stakes 36. The frame members including the side, front, and rear headers 28, 30, 32, the removable stakes 36, and the top wall struts 38 are all preferably formed from elongate hollow tubular extrusions of a lightweight and durable material, such as an aluminum alloy.

The stakes 36 are removable to allow easy access for loading and unloading of the trailer, for example by a forklift. The mechanism by which the stakes are removed is described in detail in parent application Ser. No. 08/372,773, (U.S. Pat. No. 5,658,037) which is incorporated herein by reference.

Figure 3:
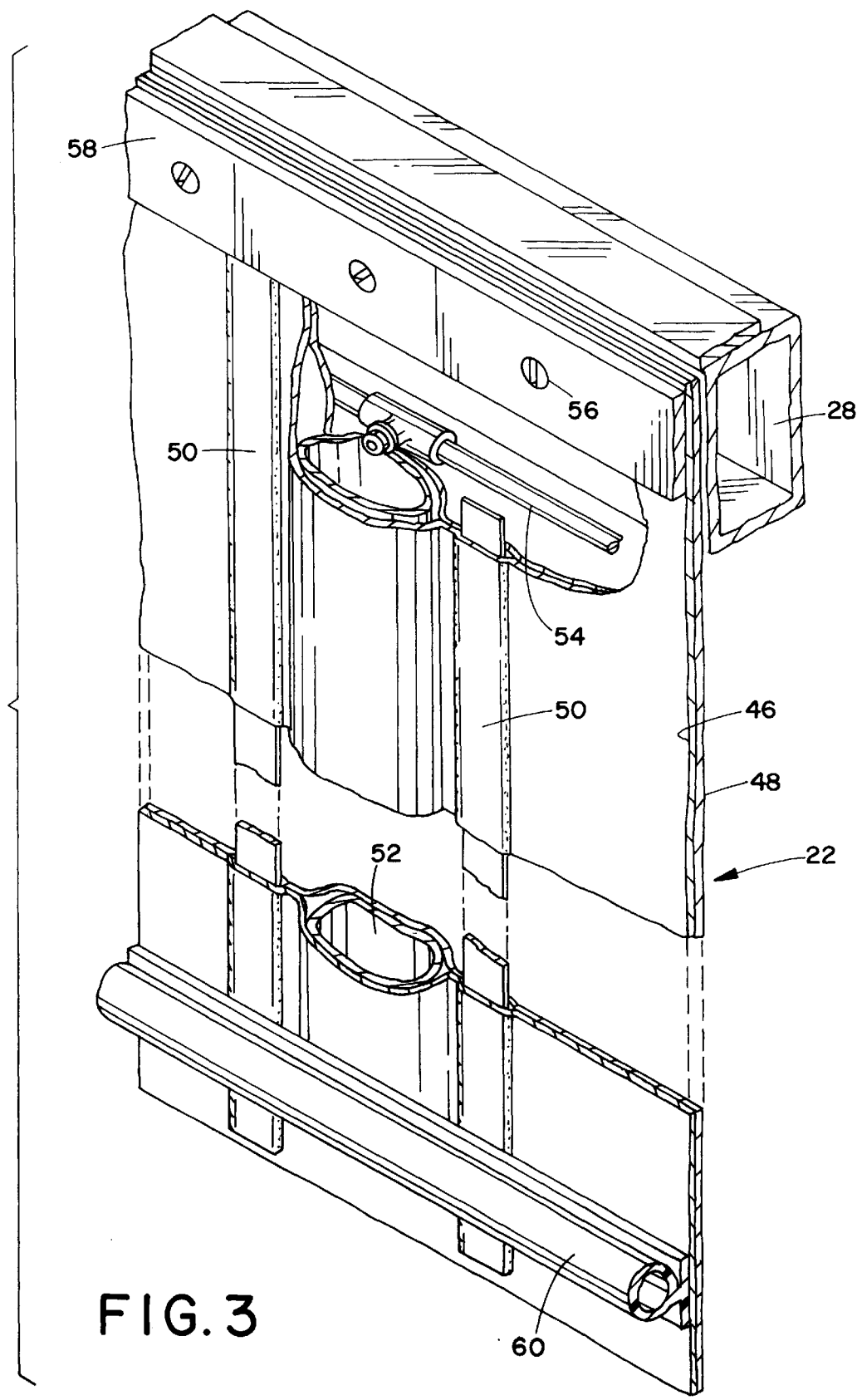
FIG. 3 is a perspective view of a part of a curtain-like retractable closure having portions of the closure broken away.

FIG. 3 illustrates the extension and retraction mechanisms of the curtain 22. The curtain 22 includes an outer layer of fabric material 46 and an inner layer of fabric material 48. Torsion springs 50 are positioned in pockets between the outer and inner layers 46, 48. These springs 50 act as a retraction mechanism which causes the curtain 22 to roll up from the extended position to the retracted position due to the spring force of the springs. Also positioned between the outer layer 46 and the inner layer 48 are a plurality of inflatable elongated tubes 52 which are connected to an air supply conduit 54. When the curtain 22 is to be unrolled from the retracted position to the extended position, air is supplied through the air conduit 54 to a plurality of inflatable tubes 52 causing the curtain to unroll because the extension force exerted by the tubes 52 overcomes the retraction force exerted by the springs 50. According to one preferred embodiment of the invention, the springs 50 and inflatable tubes 52 extend along a full height of the curtain 22. Although the extension and retraction system has been described with respect to a side curtain 22 of the trailer 10, it should be understood that the same retraction and extension mechanisms may also be used for the top curtain 20 and the rear curtain 24.

While the curtain has been depicted as including two sheets 46, 48 with the inflatable tubes 52 and springs 50 disposed therebetween, it should be understood that a single sheet may also be used with the inflatable tubes and springs attached in any known manner.

The side curtain 22 is mounted to the side header 28 which runs along the top of the trailer 10 by sandwiching the curtain between a mounting bar 58 and the header and securing the curtain with threaded fasteners 56. If desired, the curtain 22 can also include one or more tubular stiffening bars 60 extending lengthwise across the curtain to provide stability to the curtain. These stiffening bars 60 are lightweight rigid members which help to prevent the curtain from flapping due to wind.

Figure 4:
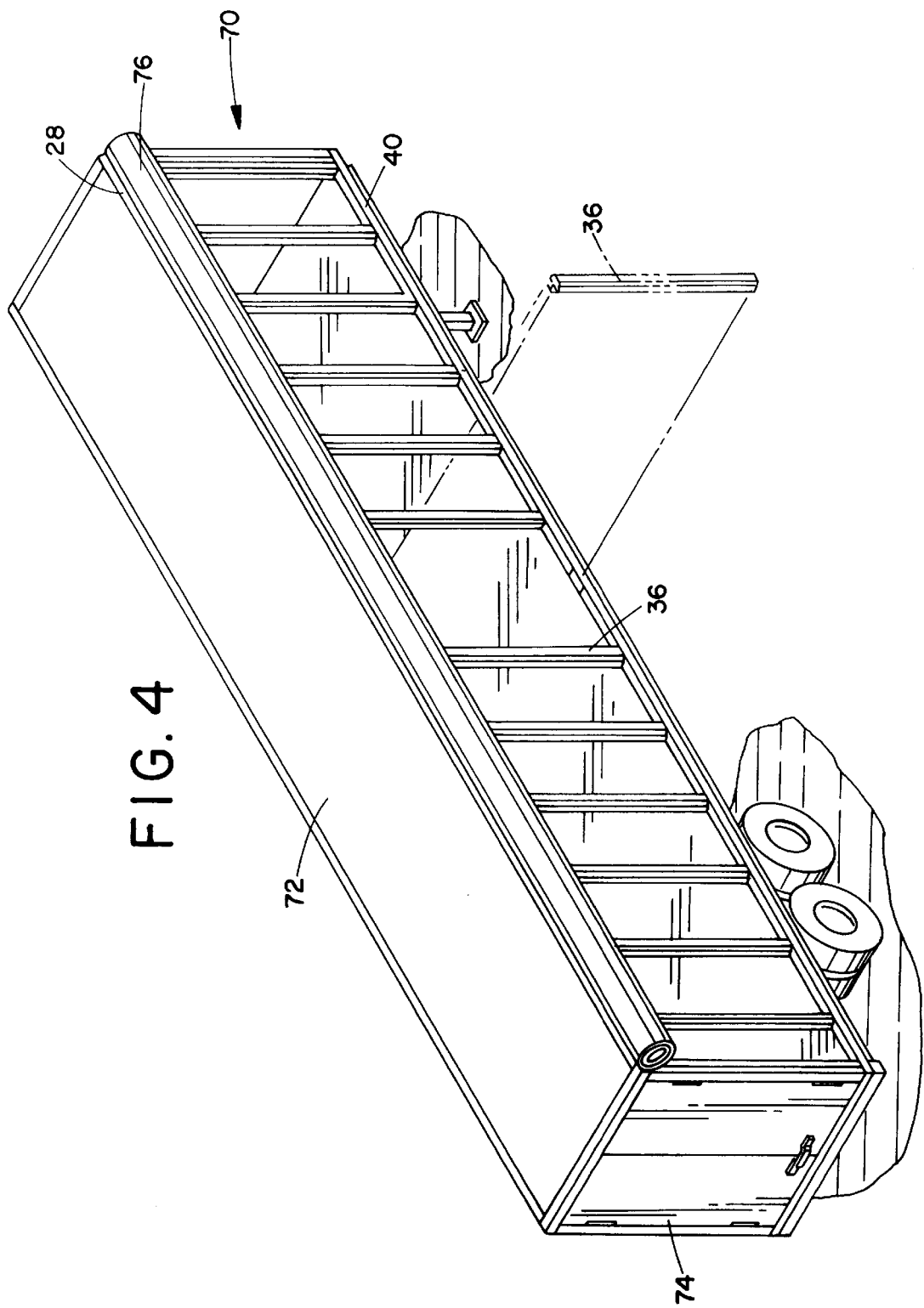
FIG. 4 is a perspective view of a flatbed trailer equipped with retractable curtain-like side walls and removable stakes according to a second embodiment of the present invention.

FIG. 4 illustrates a second embodiment of a trailer 70 having side curtains 76, a fixed top wall 72, and hinged rear doors 74. As illustrated in FIG. 4, the stakes 36 are positioned between the side headers 28 and the rub rails 40 and are removable to allow side access to the trailer 70 anywhere along a length of the trailer.

Figure 5:
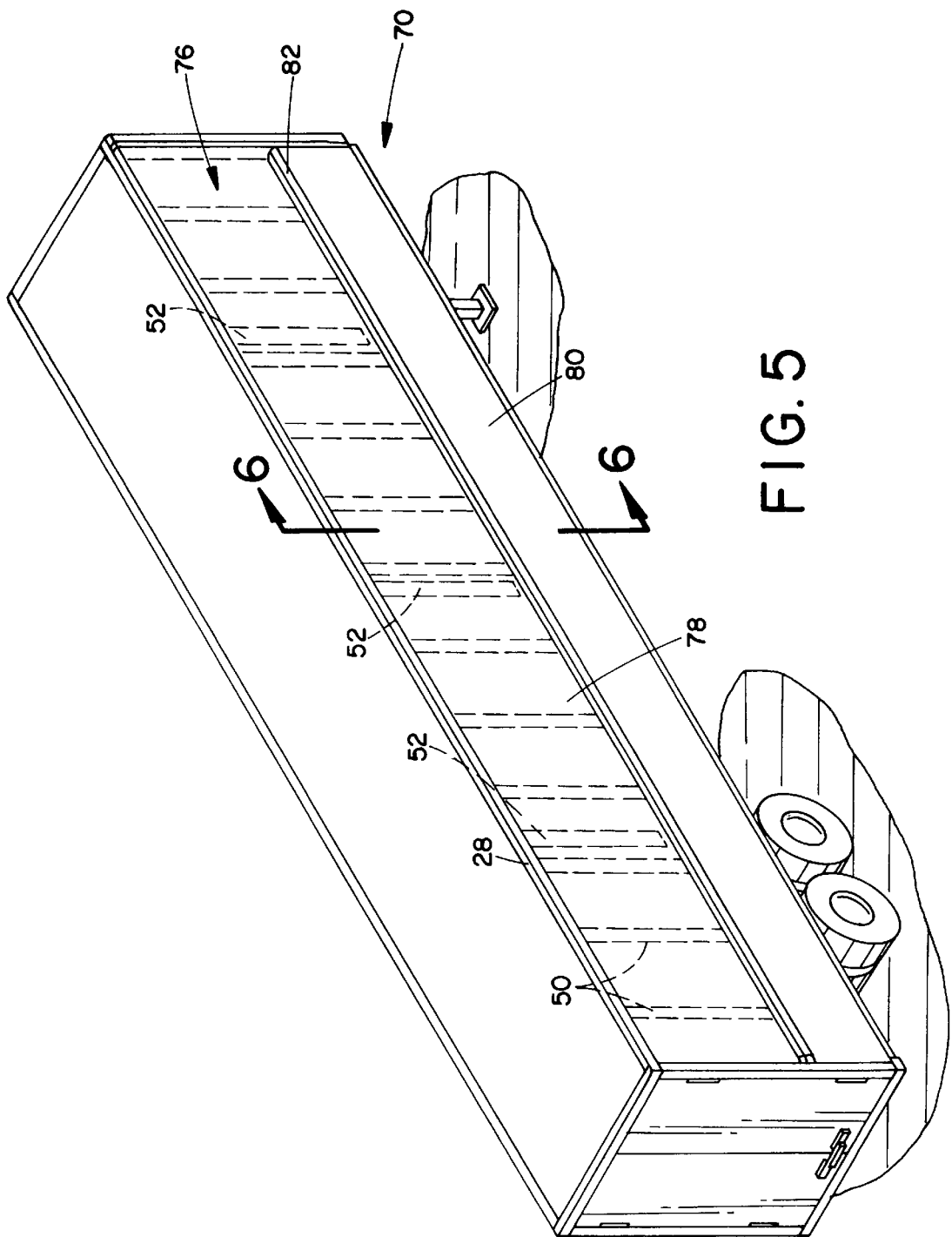
FIG. 5 is a perspective view of the flatbed trailer of FIG. 4 with the right side wall curtain in its extended position and with the locations of retraction and extension members of the curtain indicated in hidden lines.

FIG. 5 shows the trailer 70 having an alternative embodiment of a side curtain 76 according to a second preferred embodiment of the invention in which the side curtain includes an upper curtain 78 and a lower curtain 80. The upper and lower curtains 78, 80 are connected by a longitudinally extending central web 82 which is illustrated in greater detail in the cross-sectional views of FIGS. 6–8. According to the two-part curtain design of FIG. 5, the springs 50 for retracting the curtain extend from the side header 28 to the central web 82. In addition, the inflatable tubes 52 are spaced along the length of the trailer 70 and extend from the top of the curtain to the central portion of the curtain at the central web 82. The extension and retraction mechanisms extend only along the upper portion 78 of the curtain 76 and still provide sufficient force to extend and roll up the entire curtain because the curtain is of a double roll nature as best seen in FIG. 8. The inflatable tubes 52 and springs 50 are preferably provided at a ratio of between 1 to 5 and 1 to 3.

Figure 6:
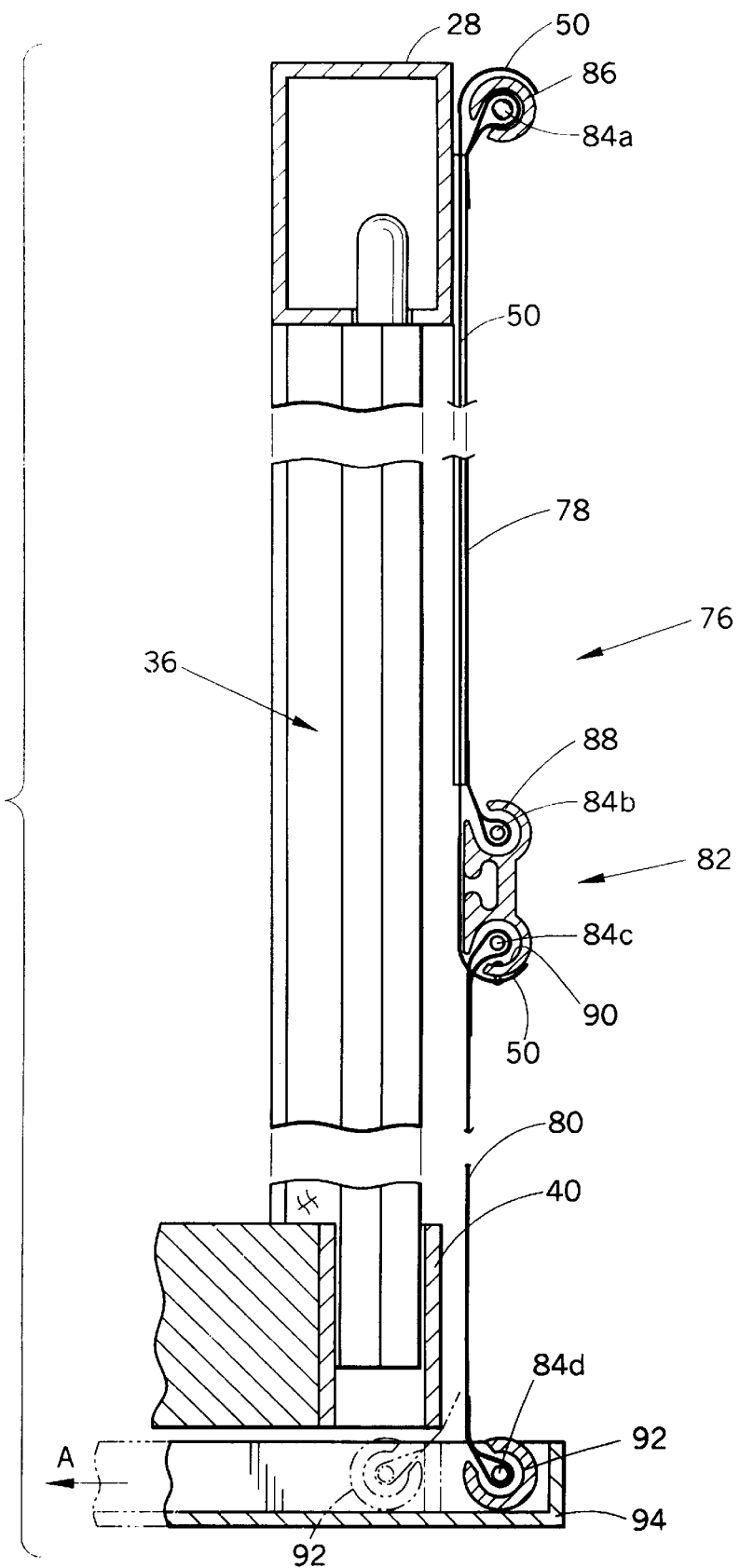
FIG. 6 is an enlarged cross-sectional view taken along line 6—6 of FIG. 5 with the curtain in the extended and untensioned position.

FIG. 6 is a side cross-sectional view of the curtain 76 of FIG. 5 including the upper curtain 78, lower curtain 80, and central web 82. As can be seen in FIG. 6, the top edge of the upper curtain 78 includes an enlarged cord member 84a which is fixed to the curtain and allows the curtain to be received in an extruded hollow curtain mounting member 86. A lower edge of the upper curtain 78 also includes a cord member 84b which is received in a first groove 88 of the central web 82. The lower curtain 80 also includes cord members 84c, 84d located at the top and bottom, respectively, of the lower curtain. The upper edge of the lower curtain 80 is received in a second groove 90 in the central web 82, while a lower edge of the curtain is received in a hollow extruded member 92. When the curtain 76 is in the extended position illustrated in FIG. 6, the curtain is maintained in this extended position by a movable tray 94 which receives the hollow extruded member 92 extending along the lower edge of the lower curtain 80. The tray 94 is moved in the direction of the arrow A to trap the extruded member 92 and the lower edge of the curtain between the tray and the side rub rail 40 on which the tray is movably mounted. The movable tray 94 retains the curtain 76 in the extended position and vertically tensions the curtain for transport as shown in hidden lines in FIG. 6.

FIG. 6 also illustrates the arrangement of one of the springs 50 extending along an inside surface of the upper curtain 78, and having an upper end of the spring wrapped over the top of the curtain mounting member 86. A lower end of the spring 50 is wrapped around the bottom of the central web 82. The springs 50 may have a constant spring force along their length or have a slightly greater spring force at an upper portion of the spring such that a "coil up" force applied to the curtain increases as the curtain is rolled up.

Figure 7:
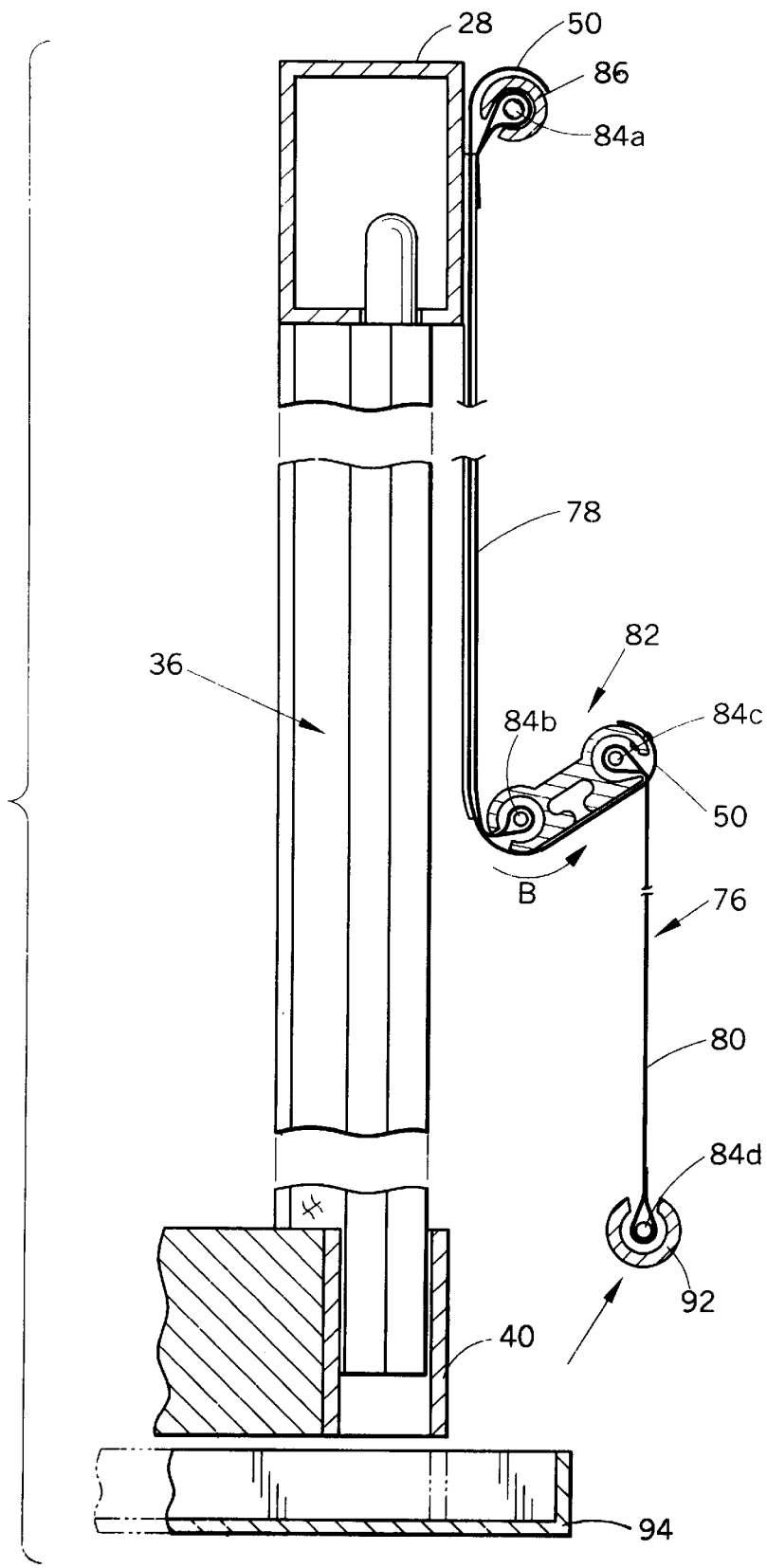
FIG. 7 is a cross-sectional view taken along line 6—6 of FIG. 5 in which the curtain is in an initial stage of retraction.
Figure 8:
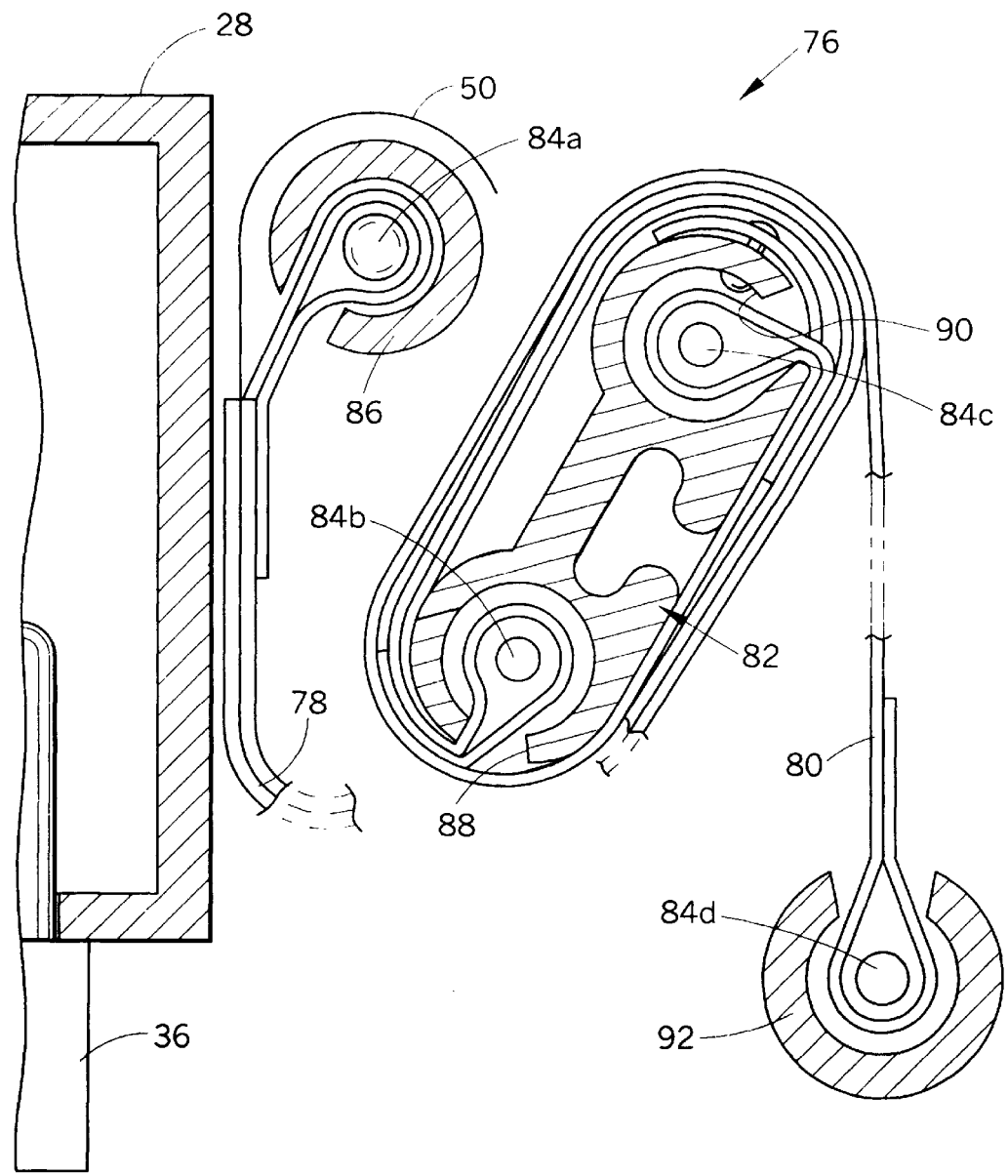
FIG. 8 is an enlarged cross-sectional view of a portion of FIG. 7 in which the retractable curtain is in a retracted position.

FIG. 7 illustrates the beginning stages of curtain roll up as the hollow extruded member 92 at the bottom of the lower curtain 80 is released from the tray 94, and the springs 50 cause the central web 82 to begin to roll outward and upward in the direction of the arrow B. The springs 50 will continue to cause the curtain to roll up wrapping both the upper curtain 78 and the lower curtain 80 around the central web.

FIG. 8 illustrates the curtain assembly 76 of FIGS. 5–7 in the retracted or coiled up position. As shown in FIG. 8, the upper curtain 78 and lower curtain 80 are wound around the central web 82, and the springs 50 hold the upper and lower curtains in the coiled up position along the side header 28 of the trailer. As can be seen most clearly in FIG. 8, the cords 84a–84d which are fixed to the upper and lower edges of the upper and lower curtains retain the curtain edges in the respective extruded supporting member 82, 86, 92 because the edge of the curtain is larger than an opening in the extruded supporting member.

Figure 9:
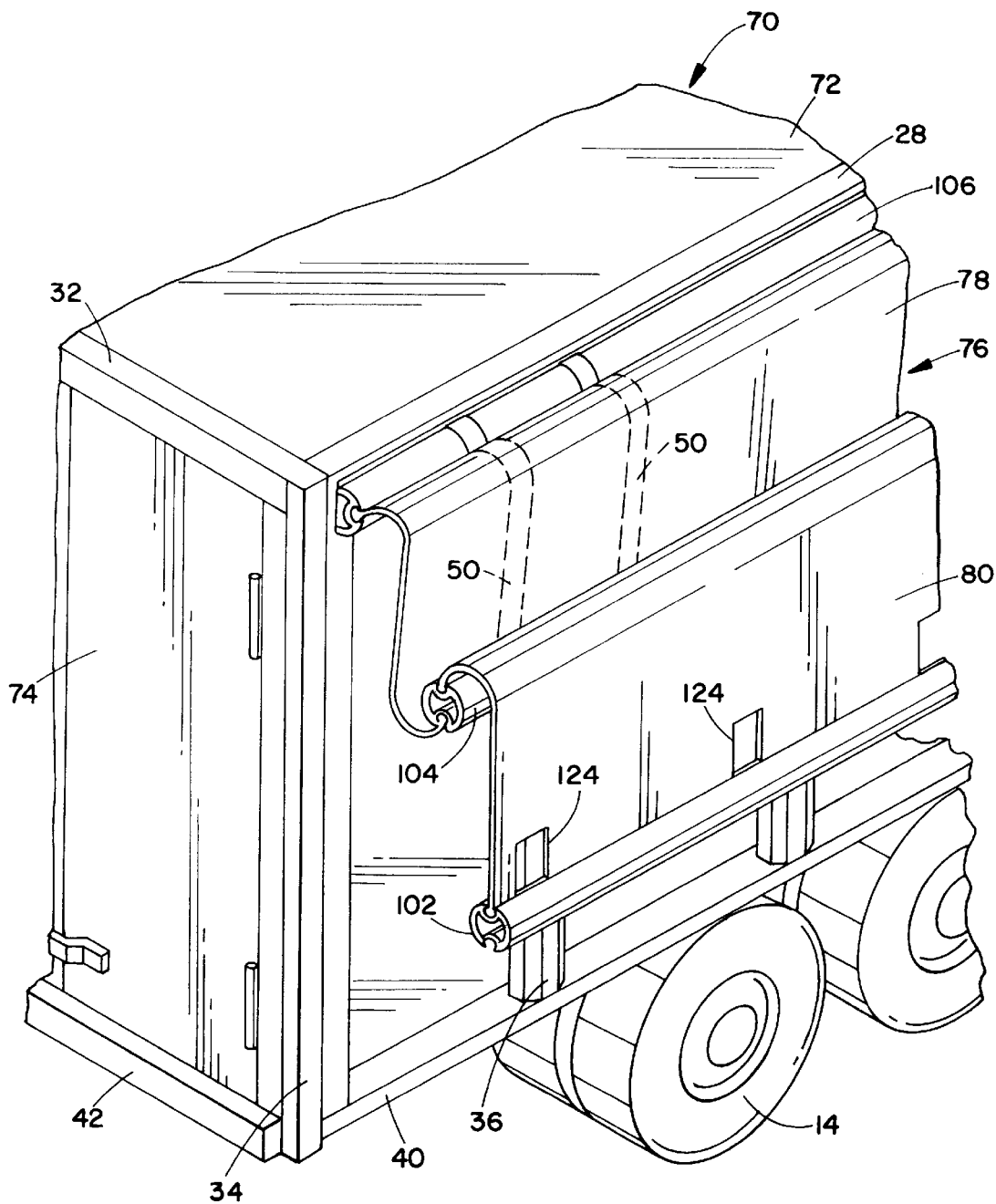
FIG. 9 is a perspective view of a portion of a flatbed trailer having a retractable side wall curtain with roll bars according to a third embodiment of the present invention with the curtain in a nearly extended position.

FIG. 9 illustrates another preferred embodiment of the present invention in which the trailer 70 has a side closure system including an upper curtain 78 and a lower curtain 80 which together form a curtain assembly 76 to enclose a side opening of the trailer. The curtain assembly 76 according to the FIG. 9 embodiment includes a first extruded roll bar 102 mounted on a lower edge of the lower curtain 80. A second extruded roll bar 104 (of the same design as the first one) connects the lower curtain 80 to the upper curtain 78 along a central part of the side wall. A third roll bar 106 secures an upper edge of the upper curtain 78 to the side header 28 of the trailer. The third roll bar 106 can be formed from the first roll bar when it is cut in half longitudinally as illustrated in FIG. 9 to provide a flat surface for securing the roll bar to the side header 28 of the trailer frame. FIG. 9 illustrates the side curtain closure in a partially retracted condition in which the springs 50 which extend along the upper curtain 78 have begun to roll the upper and lower curtains 78, 80 around the second or central roll bar 104. The springs 50 preferably extend around and over the top of the upper roll bar 106 as shown in FIG. 9.

Figure 10:
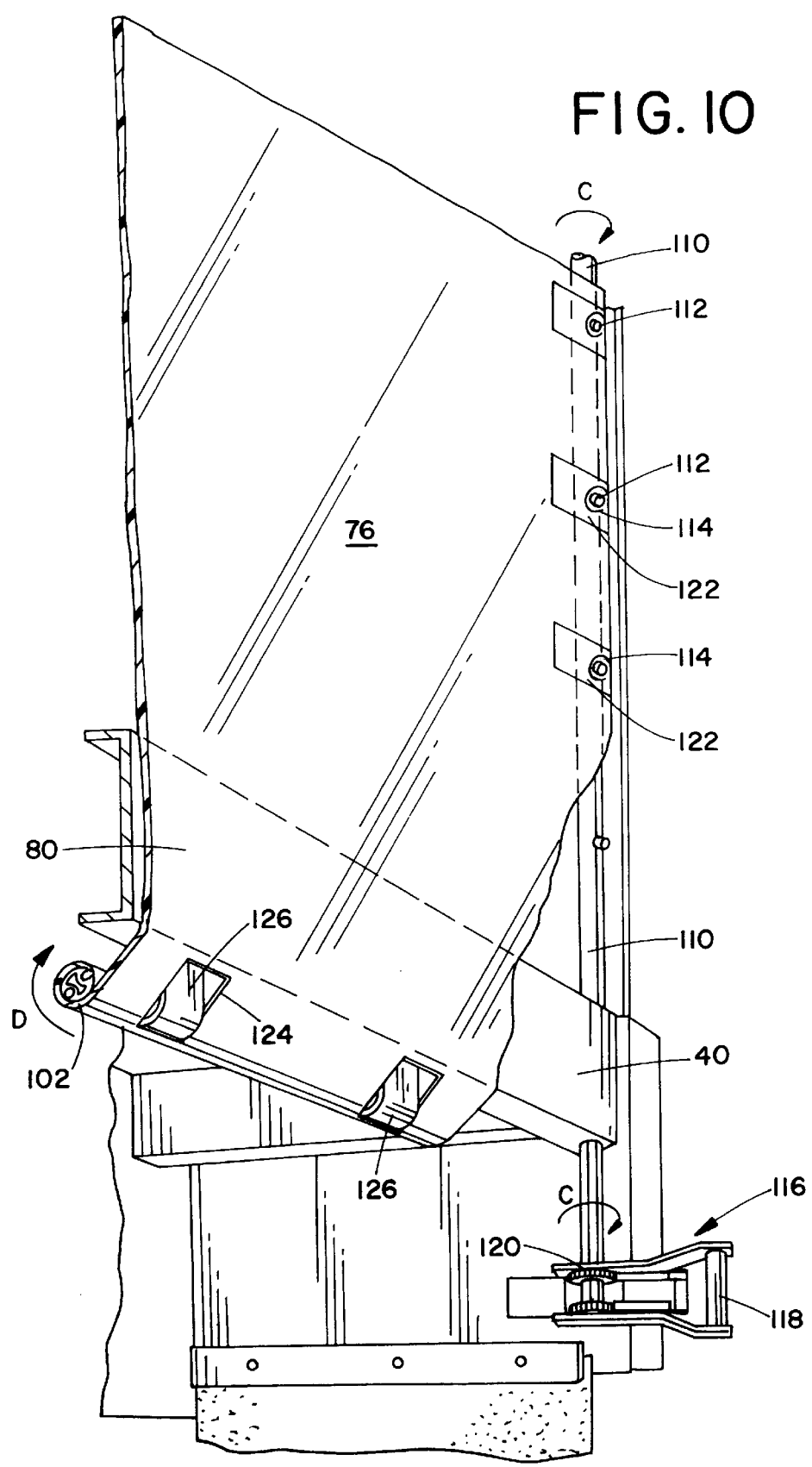
FIG. 10 is a perspective view of a portion of a flatbed trailer including the right side edge of an extended curtain and vertical and horizontal curtain tensioning mechanisms.

FIG. 10 shows a portion of the trailer 70 illustrating the horizontal and vertical tensioning mechanisms for tensioning the side curtain 76 when the curtain is in its extended position for transport. The horizontal tensioning mechanism is provided on the corner supports 34 of the trailer 70 at opposite side edges of the curtain and horizontally tensions the curtain along the entire height of the trailer. This horizontal tensioning mechanism includes a vertically positioned rotatable rod 110 having a plurality of spaced engagement members or pins 112 positioned along the length of the rod to engage correspondingly spaced attachment members or openings 114 located along the side edges of the curtain 76.

According to one preferred embodiment, nylon webbing 122 strengthens the curtain 76 around each of the openings 114 and the openings are provided with grommets. A lower end of the horizontal tensioning rod 110 is provided with a tightening mechanism 116 including a rotatable handle 118 and a ratchet mechanism 120. In order to horizontally tension the extended curtain 76, the openings 114 of the upper and lower curtains 78, 80 are placed over the corresponding pins 112 on the rod 110 and the rotatable handle 18 is rotated in the tightening direction C to roll the curtain around the rod 110 and thus tighten the curtain.

Also illustrated in FIG. 10 is a portion of the vertical tensioning mechanism including the first or bottom roll bar 102 which is connected to a bottom edge of the lower curtain 80. The lower curtain includes a plurality of spaced apart vertically extending slots 124 which allow the bottom edge of the lower curtain 80 and the lower roll bar 102 to be placed over a plurality of roll bar receiving hooks 126 located on the lower surface of the side rub rails 40 of the trailer 70. The roll bar 102 is placed onto the hooks 126 by manually moving the roll bar 102 in the direction of the arrow D and placing the roll bar on the hooks. The curtain 76 is then tightened in the vertical direction by rotation of the roll bar 102 in the direction of the arrow D. The vertical tensioning mechanism will be described further below with reference to FIGS. 15–17 which illustrate the hooks 126 and the mechanism for rotating the roll bar 102 in further detail.

Figure 11:
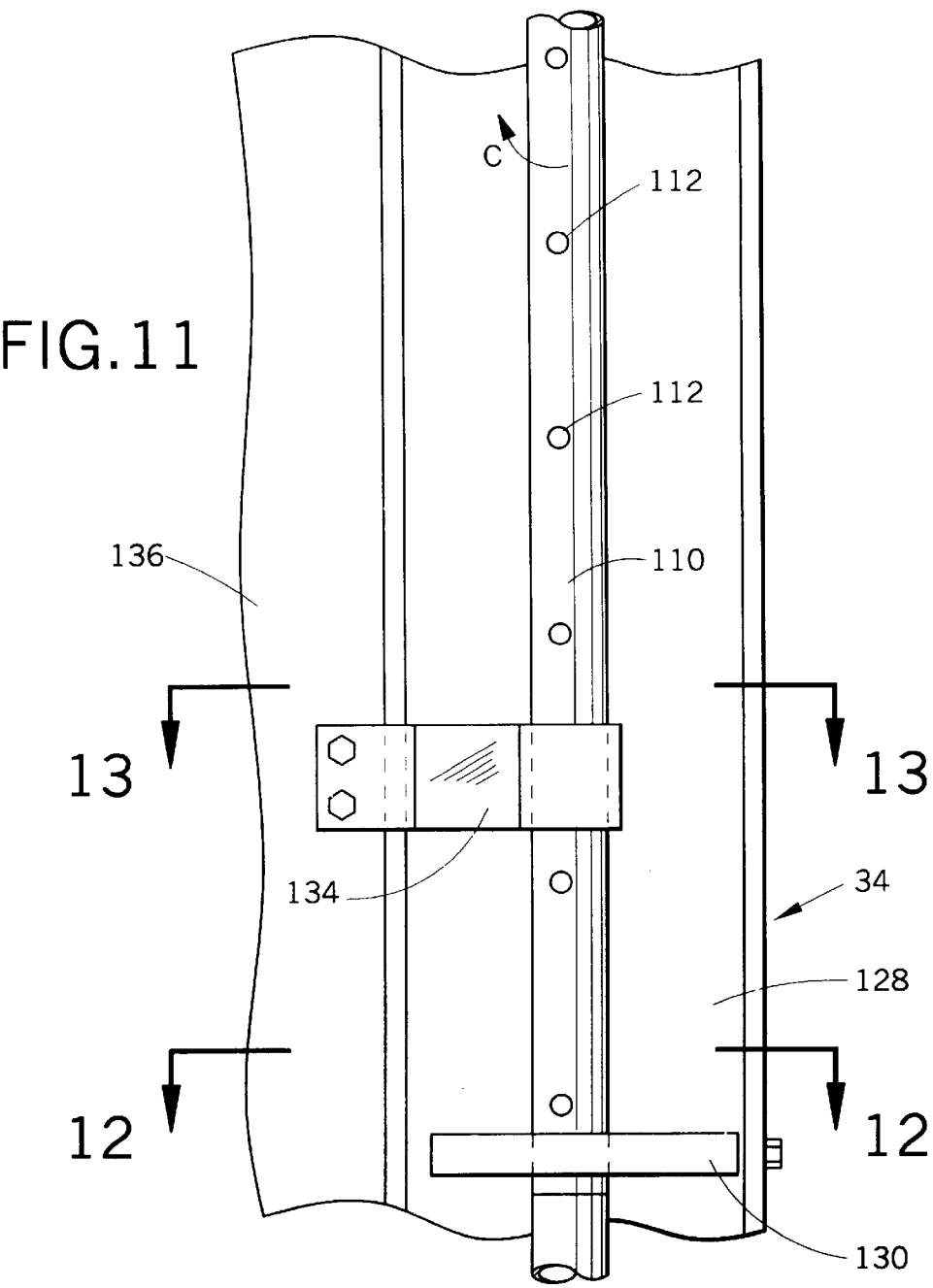
FIG. 11 is a side view of a portion of a horizontal closure mechanism for horizontally tightening a left side edge of the curtain.
Figure 12:
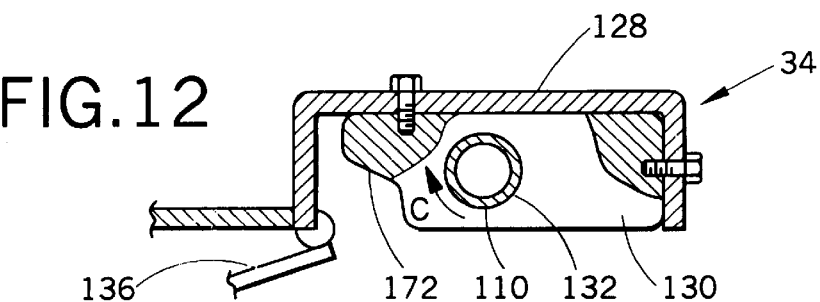
FIG. 12 is a cross-sectional view taken along line 12—12 of FIG. 11.

FIG. 10 illustrates a right side edge of the curtain 76, while FIG. 11 is a side view of a portion of a horizontal tensioning rod 110 at the left side edge of the curtain. The rod 110 is supported within a corner support 34 of the trailer body inside a substantially U-shaped channel 128 and is rotatably mounted at top and bottom ends thereof. The rod 110 is supported along its length by a plurality of bearing members 130, a top view of which is illustrated in FIG. 12. The bearing members 130 are secured to the U-shaped channel 128 and include a circular opening 132 through which the rod 110 extends and within which the rod is easily rotatable. The bearing members 130 are formed of a low friction material such as nylon.

The bearing members 130 provide lateral support for the rod 110 as the rod is rotated in the direction of the arrow C to tighten the curtain horizontally. It is to be noted that FIGS. 11–14 illustrate an opposite end of the curtain than FIG. 10, i.e., FIG. 10 shows a right side edge of the curtain and FIGS. 11–14 show a left side edge of the same curtain. Therefore, the tightening direction illustrated by the arrow C in these FIGURES will be different.

A strap member 134 is fixed at a first end to the rod 110 and secured at a second end to a rotatable flap 136 which acts as a weather seal and will be described in further detail with respect to FIGS. 13 and 14. A plurality of bearing members 130 are provided along the length of the rod 110 to prevent movement of the rod within the U-shaped channel 128 caused by the forces created during tensioning. Preferably, between two and five bearing members 130 are spaced along the length of the rod 110. The bearing members 130 are generally rectangular in shape with rounded corners and one cutout corner 172 for accommodating the curtain 76 when it is wrapped around the rod 110. A plurality of strap members 134 are also positioned along the length of the rod 110 and function to close the rotatable weather sealing flap 136 in response to rotation of the rotatable rod 110.

Figure 13:
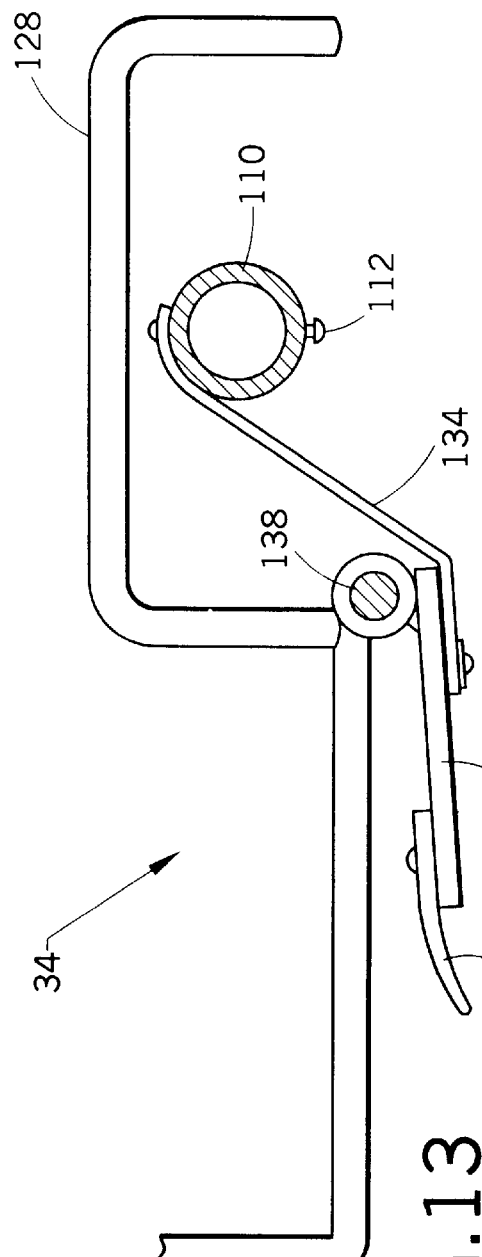
FIG. 13 is an enlarged cross-sectional view taken along line 13—13 of FIG. 11 and illustrating the weather sealing flap in an open position and the tensioning mechanism in an untensioned position.
Figure 14:
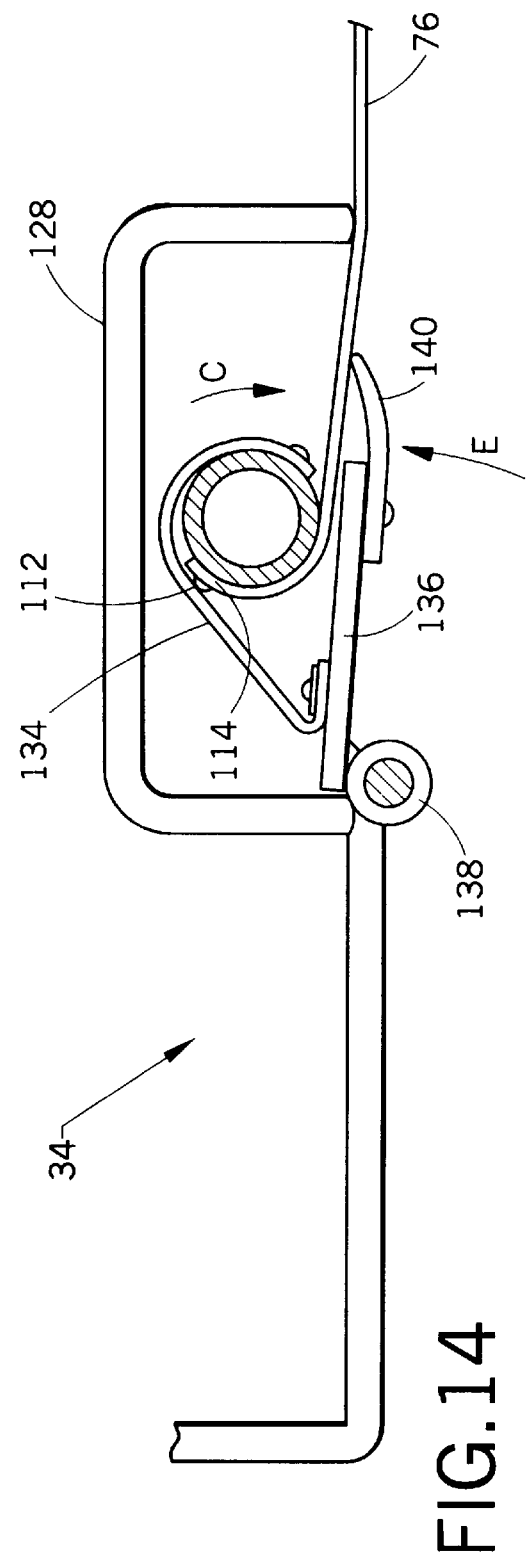
FIG. 14 shows the weather sealing flap of FIG. 13 in a closed position and the tensioning mechanism in a tensioned position.

FIGS. 13 and 14 illustrate the rotatable weather sealing flap 136 in an open position shown in FIG. 13 and in a closed sealing position shown in FIG. 14. The rotatable flap 136 extends along substantially the entire height of the curtain 76 from the top header 28 of the trailer to the lower rub rail 40. The flap 136 is rotatable on a hinge 138 which may be either a single continuous hinge extending along the full height of the flap or, alternatively may be a plurality of hinges vertically spaced along the flap. The flap 136 is a substantially rigid member which is hingedly mounted to the corner support 34 by the hinge 138 at one edge and has a flexible resilient portion 140 attached to the rigid member at an opposite edge. The flexible portion 140 extends along a length of the flap 136 for providing a weather tight seal with the curtain 76.

As illustrated in FIG. 14, the openings 114 in the side edges of the curtain 76 are placed over the pins 112 spaced along the rod 110. The rod 110 is then rotated in the direction of the arrow C by the tightening mechanism 116 illustrated in FIG. 10. As the rod 110 is rotated to tighten the side edges of the curtain 76, the first end of the strap member 134 is also rotated a corresponding amount in the direction of the arrow C causing the strap member to pull the rotatable flap 136 tightly against the exterior surface of the curtain such that the resilient sealing portion 140 of the rotatable flap forms a weather tight seal between the corner support 34 of the trailer 70 and the outer surface of the curtain. This weather seal is maintained and the curtain 76 is held in the tightened position by the rachet mechanism 120. The weather seal is easily released at the same time that the curtain tension is released by releasing the ratchet mechanism 120. As shown in FIG. 14, rotation of the rod 110 in the tightening direction C cause the flap 136 to rotate about the hinge 138 in an opposite direction E to close the weather seal. Once the weather seal 136 is closed, moisture and dirt are prevented from entering into the U-shaped channel 128 and the edge of the curtain 76 is sealed to prevent moisture and dirt from entering the trailer.

The horizontal tensioning mechanism has been described as utilizing grommets 114 and pins 112 to fix the side edges of the curtain 76 to the tightening rod 110. However, other fastening means may also be used such as hooks, snaps, or Velcro fasteners without departing from the invention.

Figure 15:
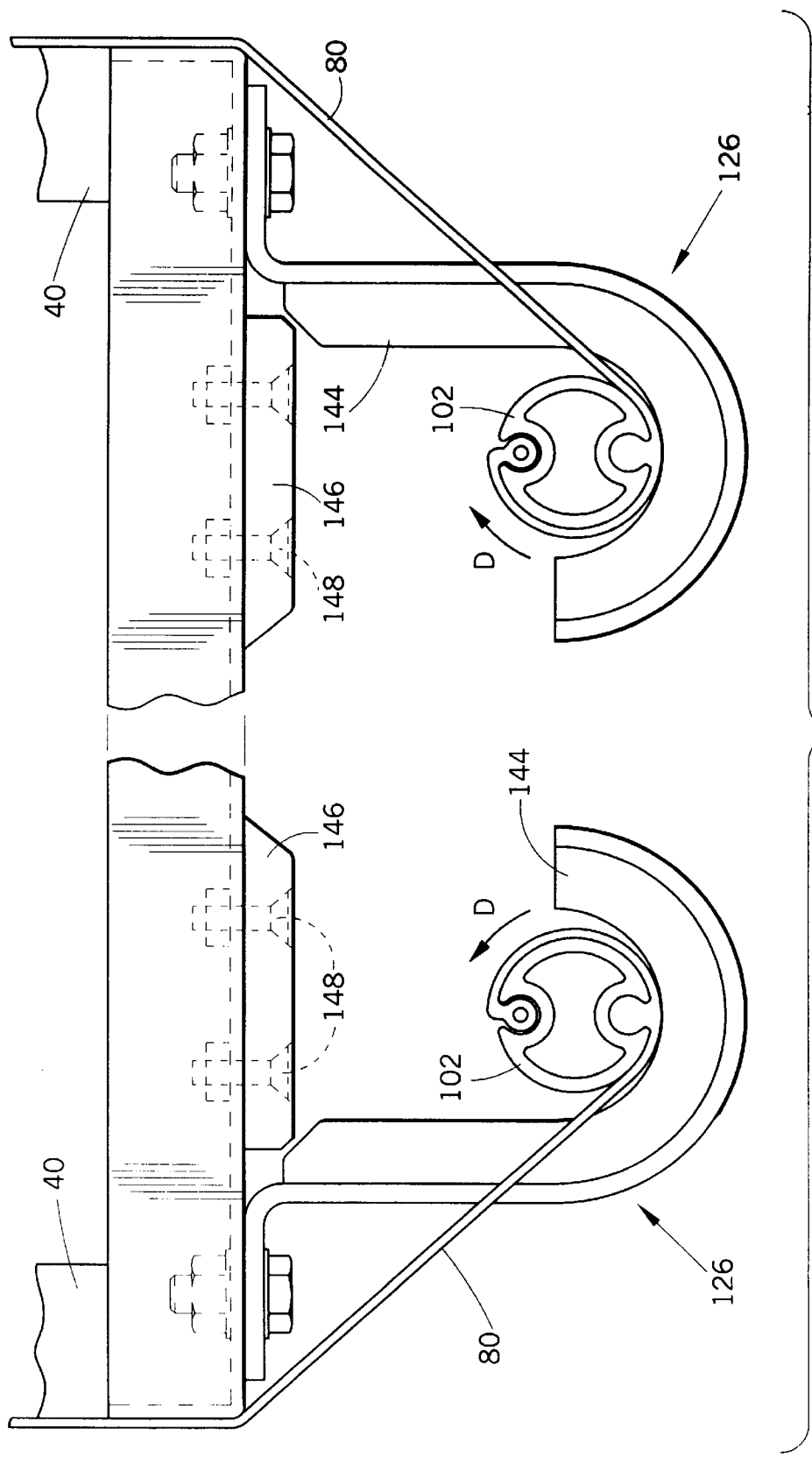
FIG. 15 is a rear view of the lower deck of the flatbed trailer including roll bar receiving hooks of the vertical tensioning mechanism.

FIG. 15 is a cross-sectional end view of the trailer 10 illustrating the hooks 126 and bottom roll bar 102 on both sides of the vehicle which form a part of the vertical tightening mechanism for tightening and securing the bottoms of the two side curtains. As described previously with reference to FIG. 10, the hooks 126 are mounted along the length of the side rub rails 40 beneath the flatbed of the trailer. The lower roll bars 102 are attached to the bottom ends of the lower curtains 80 and are placed over the hooks as illustrated in FIG. 10 with the hooks extending through the slots 124 in the curtains.

The hooks 126 are particularly designed and mounted beneath the flat bed to allow tightening of the curtain 76 by rotation of the roll bar 102 and to provide minimal frictional resistance to such rotation. Accordingly, each of the hooks 126 includes a low friction J-shaped pad 144 mounted on an inside surface of the hook and a top pad 146 mounted on the bottom surface of the trailer frame or rub rail 40 by mounting members 148. The friction reducing J-shaped pad 144 and top pad 146 are preferably formed of a low friction material which allows the roll bar and curtain to roll freely within the hooks and prevents binding or tearing of the curtain. One such material which may be used for the low friction pads 144, 146 is polyurethane. In operation, the curtain 76 is tightened in the vertical direction by rotation of the roll bar 102 in the tightening direction D to roll the lower portion of the curtain around the roll bar. As the roll bar 102 is rotated, the bar will move upward to engage or rest against the top pad 146.

The roll bars 102, 104, 106 have a cross-sectional shape which is illustrated best in FIG. 10. The roll bar cross-section is substantially circular with two semi-circular cut-out grooves 180 on opposite sides of the roll bar. These grooves 180 extend along the full length of the roll bar and are used to retain an enlarged edge of the curtain by sliding the curtain edge into the groove in a longitudinal direction. The interior 182 of the roll bar has a shape which is similar to a bow tie and accommodates a rotary wrench of the type described below. When the wrench is inserted into an end of the roll bar, the wrench can be rotated to vertically tighten the curtain. The roll bar 102 is preferably extruded from a lightweight, high strength material such as an aluminum alloy. The use of roll bars with identical cross-sectional shapes for the top, middle, and bottom roll bars 106, 104, 102 reduces the overall manufacturing costs of the curtain.

FIG. 16 illustrates a vertical tightening mechanism which is used to rotate one of the roll bars 102 within the hooks 126 to vertically tension the curtain. The tightening mechanism includes a mounting bracket 150 which is fixed to one of the rub rails 40 at a front or rear corner of the trailer. A sleeve 152 is positioned rotatably within two openings 154 in the mounting bracket 150. The rotatable sleeve 152 includes a ratchet wheel 156 fixed around one end thereof. The ratchet wheel engages a corresponding pawl 158 mounted on either the trailer body or the mounting bracket 150. Within the sleeve 152 is a longitudinally slidable wrench 160 having a cross section as illustrated in FIG. 17 which fits into an interior cavity of the roll bar 102. The wrench 160 is longitudinally slidable within the sleeve 152 manually by manipulating two pins or bolts 162 which are secured in opposite sides of the wrench 160 and extend out of the sleeve 152 through slots 164 formed in the sleeve. The wrench 160 is illustrated in FIG. 16 in an extended position in which an engagement end 166 of the wrench 160 is in engagement with the interior of the roll bar 102 shown in hidden lines. FIG. 16 also illustrates, in hidden lines, the position of the wrench 160 in a disengaged position where the engagement end 166 of the wrench is not in engagement with the roll bar 102.

As illustrated in the cross-sectional view of FIG. 17, the sleeve 152 includes inserts 168 which extend along the length of the sleeve and are fixed to an interior surface of the sleeve. These inserts 168 allow the wrench 160 to slide longitudinally in the direction of the arrow F from the extended position to the retracted position while preventing the wrench from rotating within the sleeve. An exterior end of the sleeve 152 includes a throughbore 170 through which a bar-like actuating member is inserted to allow easy rotation of the sleeve and associated wrench 160 for vertically tightening the curtain. The sleeve 152 also includes a stop 176 on an exterior surface of the sleeve which retains the sleeve in the mounting bracket 150.

In operation, the curtain is tightened vertically by first placing the roll bar 102 onto the hooks 126 along the length of the trailer with the hooks extending through the slots 124 in the curtain. The end of the roll bar 102 adjacent the tightening mechanism illustrated in FIG. 16 is then lifted up until it is aligned with the end of the sleeve 152. The engagement end 166 of the wrench 160 is inserted into the end of the roll bar 102 by sliding the wrench to the right in FIG. 16 from the retracted position to the extended position. An actuating member such as a bar or pipe is then inserted through the throughbore 170 and the sleeve 152 and wrench 160 are rotated together within the mounting bracket 150 to tighten the curtain. As the curtain is wound around the roll bar 102, the roll bar moves upward within the hooks 126 until the roll bar and wound portion of the curtain 76 tightly engage the top pad 146 of the hook. The roll bar 102 is maintained in this tightened position by the engagement of the pawl 158 with the ratchet wheel 156.

In order to release the vertical tension on the curtain, the pawl 158 of the ratchet mechanism is released in a known manner allowing the sleeve 152 and wrench 160 to rotate within the mounting bracket 150 and loosen the tension on the roll bar 102. Once the tension has been released, the wrench 160 is retracted by manually grasping the pins 162 and moving the wrench in the direction of the arrow F. Once the engagement end 166 of the wrench 160 is disengaged from the roll bar 102, the roll bar may be removed from the hooks 126 and the curtain will roll up due to the coil up force provided by the springs 50.

The curtain material which is used in the present invention is preferably a lightweight material which is resistant to tears such as water-repellant treated cotton canvas, cotton-polyester blend fabric, polyvinyl chloride coated nylon, other natural or artificial fiber fabrics, synthetic film, KEVLAR, or any combination of these materials. One example of an acceptable material is made by Seaman Corporation of Wooster, Ohio and is identified by product #4328.

Although exemplary manual horizontal and vertical tightening mechanisms have been illustrated, it should be recognized that other mechanical tightening mechanisms as well as automatic tightening mechanisms may also be used without departing from the present invention.

The invention has been described with reference to the preferred embodiments. Obviously, modifications and alterations will occur to others upon a reading and understanding of this specification. The invention is intended to include all such modifications and alterations insofar as they come within the scope of the appended claims or the equivalents thereof.

Having thus described the invention, it is claimed:

1. A retractable closure system for a vehicle comprising:
a flexible retractable curtain extendable across an opening in the vehicle, the opening having an upper edge, a lower edge, and two side edges;
an automatic retraction mechanism for retracting the flexible curtain into a roll formed adjacent the upper edge of the vehicle opening;
a plurality of attachment members located along opposite side edges of the flexible curtain which are adjacent the side edges of the vehicle opening when the flexible curtain is in an unrolled position;
a rotatable bar mounted adjacent each of the side edges of the vehicle opening and having a plurality of engagement members for engaging the plurality of attachment members of the flexible curtain; and
a tightening member associated with the rotatable bar at each of the side edges of the vehicle opening for rotating the bar when the plurality of engagement members are in engagement with the plurality of attachment members to tighten the side edges of the flexible curtain.

2. The retractable closure system according to claim 1, wherein the rotatable bar includes a gear mounted thereon, and the tightening member includes a ratchet and pawl assembly for tightening the sides of the flexible curtain and for preventing rotation of the rotatable bar when the flexible curtain is in a tightened state for transport.

3. The retractable closure system according to claim 1, wherein the tightening of the curtain with the tightening member forms a weather tight seal by rotation of a flap from an open position in which the side edges of the flexible curtain are exposed to an exterior of the vehicle to a closed position in which the flap covers the side edges of the flexible curtain.

4. The retractable closure system according to claim 3, wherein the flap includes a flexible weather seal extending along the side edge of the vehicle opening, said flap forming a seal between the side edge of the vehicle opening and the flexible curtain.

5. The retractable closure system according to claim 3, wherein the flap is pivotable about an axis which is parallel to an axis of rotation of the rotatable bar.

6. The retractable closure system according to claim 5, wherein the flap is connected to the rotatable bar by a flexible actuating member, and wherein rotation of the tightening member causes rotation of the rotatable bar and rotation of the flap from an open position to a sealing position.

7. The retractable closure system according to claim 6, wherein rotation of the rotatable bar in a first direction causes rotation of the flap in an opposite direction.

8. The retractable closure system according to claim 1, wherein the automatic retraction mechanism includes a plurality of springs extending along a surface of the curtain for automatically retracting the curtain.

9. The retractable closure system according to claim 8, further comprising a pneumatic curtain unrolling mechanism.

10. The retractable closure system according to claim 1, wherein the attachment members comprise spaced apart holes in the edges of the flexible curtain and the engagement members include pins which extend from the rotatable bar and are received in the spaced apart holes.

11. A retractable closure system for a curtainside vehicle comprising:
    a flexible retractable curtain extendable over a side opening in the vehicle, the opening having an upper edge, a lower edge, and two side edges;
    a roll bar attached to a lower edge of the curtain and extending along a length of the curtain;
    an automatic retraction mechanism for retracting the flexible curtain from an extended position covering the vehicle opening to a retracted position in which the curtain is in a roll adjacent the upper edge of the vehicle opening; and
    a vertical tightening mechanism for providing vertical tension to the curtain in the extended position, the vertical tightening mechanism including a rotatable wrench configured to be non-rotatably received within an end of the roll bar and rotated to provide vertical tension to the curtain.

12. The retractable closure system according to claim 11, wherein the tightening mechanism further comprises a plurality of roll bar receiving hooks mounted underneath a deck of the vehicle for holding the roll bar prior to tightening.

13. The retractable closure system according to claim 12, wherein the curtain includes a plurality of vertical slots adjacent the lower edge thereof through which the roll bar receiving hooks extend.

14. The retractable closure system according to claim 11, wherein the roll bar is a substantially cylindrical bar including a longitudinal channel having a substantially circular cross-section for receiving an enlarged lower edge of the curtain.

15. The retractable closure system according to claim 14, wherein the wrench is non-rotatably mounted within a sleeve and the wrench includes a pin for moving the wrench longitudinally within the sleeve to engage and disengage the end of the roll bar.

16. The retractable closure system according to claim 15, wherein the sleeve and the wrench are rotated within a fixed sleeve seat to vertically tension the curtain.

17. A retractable closure for a curtainside vehicle comprising:
    a flexible curtain having an upper edge, a lower edge, and two side edges and being configured to cover an opening of the curtainside vehicle;
    a first cord bonded to the upper edge of the curtain along a full length of the upper edge;
    a second cord bonded to the lower edge of the curtain along a full length of the lower edge; and
    two roll bars each having at least one longitudinal channel having a substantially semi-circular cross section and sized to receive one of the first and second cords to fix the upper and lower edges of the curtain to the roll bars.

18. The retractable closure according to claim 17, further comprising a second flexible curtain having an upper edge fixed to a side of the curtainside vehicle and a lower edge including a third cord received in a second of the at least one longitudinal channel of one of the roll bars.

19. The retractable closure according to claim 17, wherein the two roll bars are extruded aluminum.

20. The retractable closure according to claim 19, wherein the roll bars have a hollow interior in the shape of a bow tie.

21. The retractable closure according to claim 17, wherein said flexible curtain comprises an upper curtain section and a lower curtain section connected by a third roll bar having two longitudinal channels with substantially semi-circular cross sections for receiving edges of the upper and lower curtain sections.

* * * * *